Oct. 6, 1925.
W. R. HAMILTON
1,556,107
PORTABLE DRILLING RIG
Filed Jan. 30, 1923     2 Sheets-Sheet 2
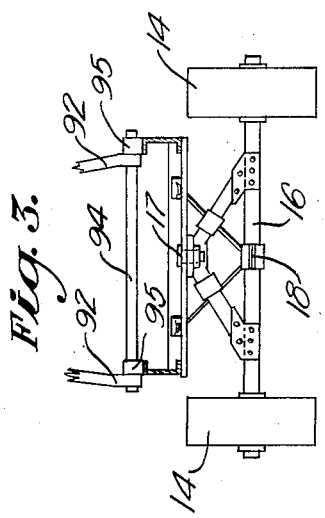
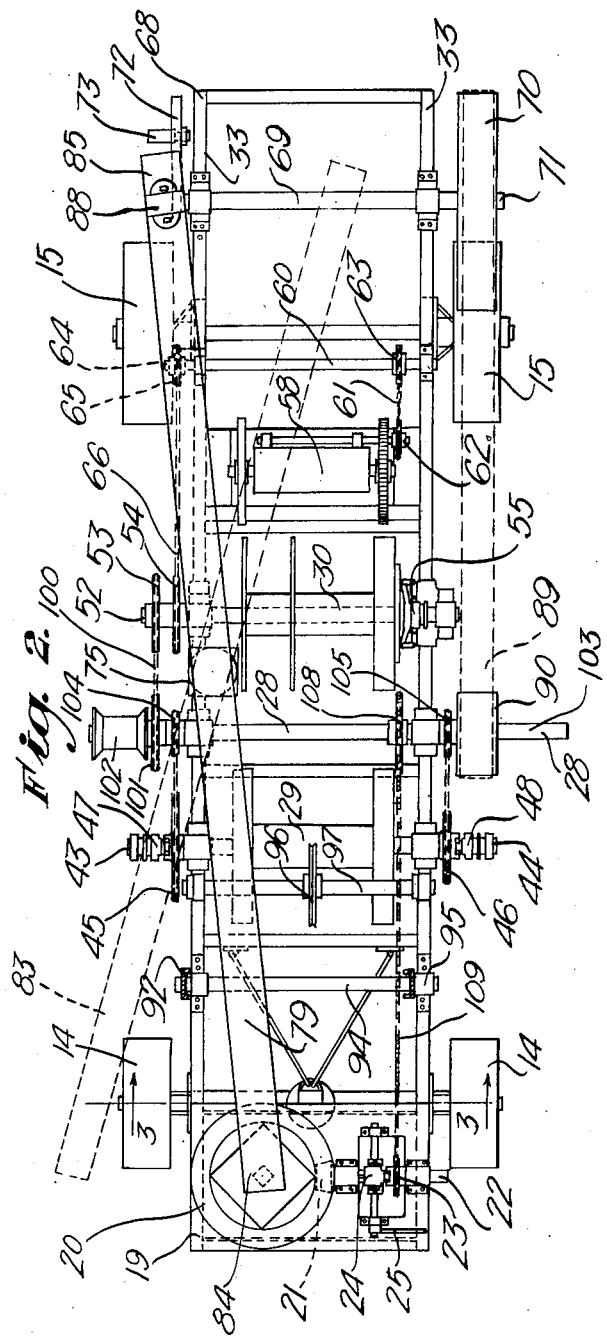
INVENTOR:
WILLIAM R. HAMILTON,
BY
Graham + ?
ATTORNEYS.

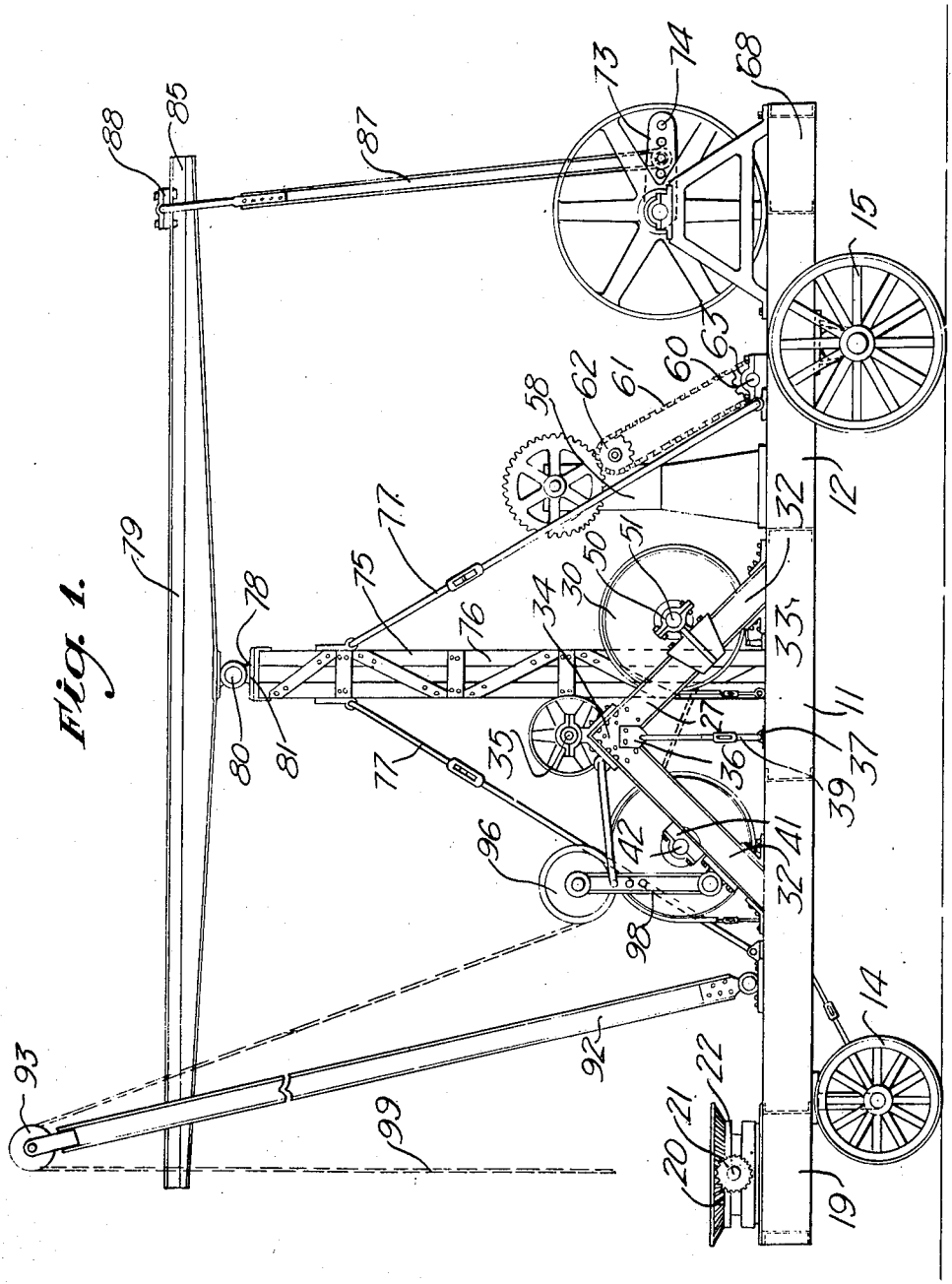

Patented Oct. 6, 1925.

1,556,107

UNITED STATES PATENT OFFICE.

WILLIAM R. HAMILTON, OF LOS ANGELES, CALIFORNIA.

PORTABLE DRILLING RIG.

Application filed January 30, 1923. Serial No. 615,800.

*To all whom it may concern:*

Be it known that I, WILLIAM R. HAMILTON, a citizen of the United States, residing at Los Angeles, in the county of Los Angeles, State of California, have invented a new and useful Portable Drilling Rig, of which the following is a specification.

My invention relates to portable well drilling equipment and it is an object thereof to provide an improved form of portable drilling rig combining both reciprocating and rotary equipment.

It is an object of the invention to provide an equipment of this character which is particularly suitable to prospecting work.

It is a further object of the invention to provide a simplified form of driving gear from which either the rotary or the reciprocating equipment may be interchangeably driven.

It is also a further object of the invention to provide a portable equipment in which the high degree of efficiency attained in stationary equipment may be attained.

A further object of the invention is to provide a framework for supporting the cable drums of the equipment which also serves as a truss for reinforcing the framework of the vehicle mounting the equipment.

A still further object of the invention is to provide a device of this character in which the walking beam will not interfere with the operation of the rotary equipment or the use of the hoisting equipment.

The specific advantages and further objects of the invention will be made evident hereinafter.

Referring to the drawings, which are for illustrative purposes only,

Fig. 1 is an elevation view of a portable drilling rig embodying the features of my invention.

Fig. 2 is a plan view corresponding to Fig. 1.

Fig. 3 is a fragmentary sectional view taken upon a plane represented by the line 3—3 of Fig. 2.

As shown in the drawing, I provide a vehicle 11 comprised of a channel iron frame 12, mounted upon front wheels 14 and rear wheels 15. An axle 16, upon which the front wheels 14 are mounted, is pivoted upon a king pin 17 so that the front wheels may be turned in either direction to steer the vehicle when same is drawn by attaching a draft link to a clevis 18 attached centrally to the axle 16.

Upon the forward end 19 of the vehicle, I mount a rotary table 20. This table 20 is so mounted that the center of rotation thereof is disposed somewhat to the right of the center of the vehicle and is driven by a bevel pinion 21 mounted upon a shaft 22 carrying a sprocket 23 which is turnable upon the shaft 22 and is brought into driving relationship therewith by means of a clutch 24 adapted to be operated by a handle 25. The placing of the rotary table so that the center of rotation thereof is somewhat to the side contributes very materially to the interchangeability of the equipment from rotary action to reciprocatory action as will be hereinafter fully explained.

Near the center of the vehicle, I mount a jack frame 27 which is adapted to carry a jack shaft 28, a main cable drum 29, and a sand reel 30. This jack frame 27 employs pairs of channel members 32 mounted upon side channels 33 of the vehicle, these channel members 32 being diagonally inclined so as to form an apex 34 at which pillow blocks 35, for supporting the jack shaft 28, are mounted. Between a plate 36 riveted at the apex 34 and an attachment member 37 mounted upon the side channels 33 there extends a truss bar 39 provided with a turn buckle so that an upward pull may be exerted at the center of each of the side channels to truss them against flexure under the load being supported. Forwardly upon the jack frame, blocks 41 are mounted for carrying a shaft 42 upon which the main drum 29 is mounted. Upon the extending ends 43 and 44 of the shaft 42, a large sprocket 45 and a small sprocket 46 are respectively mounted and provided with jaw clutches 47 and 48 for bringing either of the sprockets into driving engagement with the shaft 42. Rearwardly upon the jack frame 27 blocks 50 are mounted for carrying a shaft 51 which supports the sand reel 30. Upon the end 52 of the shaft 51, sprockets 53 and 54 are keyed. The sand reel 30 is turnably mounted upon the shaft 52 and is driven through a friction clutch 55, as the occasion demands.

As a driving means for the drilling equipment, a motive device such as an engine 58 is mounted upon the vehicle and is adapted to drive a countershaft 60 through a chain 61 running over sprockets 62 and 63. The outwardly extending end 64 of the shaft 60 has a sprocket 65 mounted thereupon which drives the shaft 52 by means of a chain 66 which runs over the sprocket 54. At the rear end 68 of the vehicle a shaft 69 is extended across the channel members 33 and has a pulley 70 mounted upon one end 71 thereof and a crank 72 mounted upon the opposite end. The crank 72 is provided with a crank pin 73 which is adapted to be placed in one of the holes 74 and the effective lengths of the crank thereby adjusted.

Near the center and upon the same side of the vehicle as the center of rotation of the table 20 a jack post 75, built up of latticed angle members 76 and supported in an erect position by truss bars 77, is mounted and supports upon a special center iron 78 a walking beam 79. Center iron 78 is provided with a horizontally disposed pivot 80 which permits the walking beam to be vertically reciprocated and is further provided with a pair of co-acting plates 81 which are placed flat upon the top of the jack post and provide a means whereby the walking beam 79 may be swung through a horizontal plane, as indicated by the dotted lines 83 in Fig. 2, so that the forward end 84 of the walking beam will be out of the way when it is desired to raise or lower tubing or casing in the well being drilled. The walking beam 79, being situated at the side of the hoisting equipment, does not interfere with the use of any of the drums. It will be perceived that when the forward end 84 of the walking beam 79 is over the center of the rotary table 20 the rear end 85 thereof is in alinement with the crank 72 so that it may be reciprocated by means of a connecting rod 87 which at its lower end works upon the pin 73 and has its upper end pillowed in a box 88 mounted upon the walking beam, as shown in Fig. 1. The crank 72 is driven by means of a belt 89 which operates over the pulley 70 and a drive pulley 90 mounted upon the jack shaft 28.

A derrick 92, provided at its upper end with a crown block 93, is mounted upon a shaft 94 which extends between pillow blocks 95 mounted forwardly upon the side channels 33. In lowering or raising articles within the hole being drilled, the cable mounted upon the drum 29 is passed over the crown block 93 so that it may be lowered directly into the hole. In Fig. 1 of the drawing, I show a sand line 99 running from the sand reel 30 over an intermediate sheave 96 and the crown block 93. The sheave 96 is mounted upon a horizontal shaft 97 which extends between two arms 98 mounted upon the jack frame, and is adapted to slide back and forth upon the shaft 97 so that the reeling of the cable or sand line upon their respective drum and reel may be accommodated by a corresponding lateral movement of the sheave 96 upon the shaft 97.

The driving of the different parts of the equipment is accomplished as follows:

The driving of the countershaft 60 from the engine 58 by chain 61 has already been explained. From the sprocket 64, chain 66 extends over sprocket 54 mounted upon the shaft 52. This shaft is adapted to turn within the sand reel 30 and is in constant rotation, driving the jack shaft 28 through a chain 100 which runs over the sprocket 53 mounted upon the shaft 52 and a sprocket 101 mounted upon the jack shaft 28 adjacent to a spool 102 which may be mounted as shown or which may be transferred to the end 103 of the shaft 28 as conditions may require. It will be perceived that whenever the engine is in operation, both the shaft 52 and the jackshaft 28 are revolved, and that when it is desired to drive the crank 72, belt 89 is placed over the pulleys 70 and 90. The sprockets 45 and 46 which are loosely mounted upon the shaft 42 are driven from sprockets 104 and 105 keyed upon the jack shaft 28. When it is desired to drive the drum 29, either the clutch 47 or the clutch 48 may be brought into engagement depending upon the power ratio desired. From a sprocket 108 also mounted upon the jack shaft 28, a chain 109 runs to the sprocket 23 which is loosely mounted upon the shaft 22 and is adapted to be engaged by the clutch 24 when it is desired to drive the rotary equipment. It is to be understood that the engine 58 is steam driven; otherwise it would be necessary to provide a clutch in the driving arrangement.

In the apparatus herein described the rotary and reciprocating equipment are so disposed that one will not interfere with the other. When it is desired to use the rotary table or to use the derrick in lifting, the walking beam may be swung to the side and in such position be entirely out of the way of any cables, either from the drum 29 or the sand reel 30; but this feature does not interfere with the practical and efficient driving of the walking beam, as, when the walking beam is in operating position, the rear end thereof is in driving alinement with the crank provided for that purpose. A further feature of the invention resides in the interconnecting drives between the different elements which provide the utilization of either the rotary table 20, the main drum 29, or the sand reel 30, without having to take down or place driving shafts or make any driving connection other than the throwing in of the necessary clutches to provide the proper driving engagement of a rotating member with the member to be driven.

I claim as my invention:

1. In a portable drilling rig of the class described, the combination of: a vehicle having side frame members; a rotary table mounted at the forward end of said vehicle; a jack frame situated upon said vehicle, said jack frame comprising an A bracket mounted upon each of said side frame members, each formed of a pair of inclined legs converging upwardly from said frame members to an apex; a tension member disposed between each apex and a central point on each of said frame members for trussing said frame members; a jack shaft mounted upon said jack frame; means for driving said jack shaft; a sprocket mounted near each end of said jack shaft; a drum shaft having a small sprocket at one end thereof and a large sprocket at the other end thereof, each of said drum shaft sprockets being drivable from one of said jack shaft sprockets; and clutch means whereby said drum may be driven from said jack shaft through either said large sprocket or said small sprocket.

2. In a portable drilling rig of the class described, the combination of: a vehicle having side frame members; a rotary table mounted at the forward end of said vehicle; a jack frame situated upon said vehicle, said jack frame comprising an A bracket mounted upon each of said side frame members, each formed of a pair of inclined legs converging upwardly from said frame members to an apex; a tension member disposed between each apex and a central point on each of said frame members for trussing said frame members; a sand reel shaft mounted upon said jack frame; a sand reel upon said sand reel shaft; a clutch upon said sand reel shaft adapted to engage said sand reel; means for continuously driving said sand reel shaft; a jack shaft mounted upon said jack frame; means for driving said jack shaft from said sand reel shaft; a sprocket mounted near each end of said jack shaft; a drum shaft having a small sprocket at one end thereof and a large sprocket at the other end thereof, each of said drum shaft sprockets being drivable from one of said jack shaft sprockets; and clutch means whereby said drum may be driven from said jack shaft through either said large sprocket or said small sprocket.

3. In a portable drilling rig of the class described, the combination of: a vehicle having side frame members; a rotary table mounted at the forward end of said vehicle; a jack frame situated upon said vehicle, said jack frame comprising an A bracket mounted upon each of said side frame members, each formed of a pair of inclined legs converging upwardly from said frame members to an apex; a tension member disposed between each apex and a central point on each of said frame members for trussing said frame members; a sand reel shaft mounted upon said jack frame; a sand reel upon said sand reel shaft; a clutch upon said sand reel shaft adapted to engage said sand reel; means for continuously driving said sand reel shaft; a jack shaft mounted upon said jack frame; means for driving said jack shaft from said sand reel shaft; a sprocket mounted near each end of said jack shaft; a drum shaft having a small sprocket at one end thereof and a large sprocket at the other end thereof, each of said drum shaft sprockets being drivable from one of said jack shaft sprockets; clutch means whereby said drum may be driven from said jack shaft through either said large sprocket or said small sprocket; a jack post mounted to one side of said jack frame; and a walking beam so mounted upon said jack post as to be swingable horizontally to a position with the end thereof in working alignment with the center of said rotary table.

4. In a portable drilling rig of the class described, the combination of: a vehicle having side frame members; a rotary table mounted at the forward end of said vehicle; a jack frame situated upon said vehicle, said jack frame comprising an A bracket mounted upon each of said side frame members, each formed of a pair of inclined legs converging upwardly from said frame members to an apex; a tension member disposed between each apex and a central point on each of said frame members for trussing said frame members; a sand reel shaft mounted upon said jack frame; a sand reel upon said sand reel shaft; a clutch upon said sand reel shaft adapted to engage said sand reel; means for continuously driving said sand reel shaft; a jack shaft mounted upon said jack frame; means for driving said jack shaft from said sand reel shaft; a sprocket mounted near each end of said jack shaft; a drum shaft having a small sprocket at one end thereof and a large sprocket at the other end thereof, each of said drum shaft sprockets being drivable from one of said jack shaft sprockets; clutch means whereby said drum may be driven from said jack shaft through either said large sprocket or said small sprocket; a jack post mounted to one side of said jack frame; a walking beam so mounted upon said jack post as to be swingable horizontally to a position with the end thereof in working alignment with the center of said rotary table; and a derrick mounted forwardly upon said vehicle having a crownblock upon the upper extremity thereof.

5. In a portable drilling rig of the class described, the combination of: a vehicle having side frame members; a rotary table mounted at the forward end of said vehicle; a jack frame situated upon said vehicle, said jack frame comprising an A bracket mounted upon each of said side frame members, each formed of a pair of inclined legs converging upwardly from said frame members to an apex; a tension member disposed between each apex and a central point on each of said frame members for trussing said frame members; a sand reel shaft mounted upon said jack frame; a sand reel upon said sand reel shaft; a clutch upon said sand reel shaft adapted to engage said sand reel; means for continuously driving said sand reel shaft; a jack shaft mounted upon said jack frame; means for driving said jack shaft from said sand reel shaft; a sprocket mounted near each end of said jack shaft; a drum shaft having a small sprocket at one end thereof and a large sprocket at the other end thereof, each of said drum shaft sprockets being drivable from one of said jack shaft sprockets; clutch means whereby said drum may be driven from said jack shaft through either said large sprocket or said small sprocket; a jack post mounted to one side of said jack frame; a walking beam so mounted upon said jack post as to be swingable horizontally to a position with the end thereof in working alignment with the center of said rotary table; a derrick mounted forwardly upon said vehicle having a crownblock upon the upper extremity thereof; and a crank for reciprocating said walking beam mounted upon said vehicle in a position of driving alignment with the rear end of said walking beam when said walking beam is in alignment with said rotary table.

In testimony whereof, I have hereunto set my hand at Los Angeles, California, this 22nd day of January, 1922.

WILLIAM R. HAMILTON.